(12) United States Patent
Kim et al.

(10) Patent No.: US 8,633,868 B2
(45) Date of Patent: Jan. 21, 2014

(54) APPARATUSES FOR AND METHODS OF DISPLAYING THREE-DIMENSIONAL IMAGES

(75) Inventors: Chang-jung Kim, Yongin-si (KR); In-kyeong Yoo, Yongin-si (KR); Young-soo Park, Yongin-si (KR); Chan-hee Lee, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 847 days.

(21) Appl. No.: 12/659,156

(22) Filed: Feb. 26, 2010

(65) Prior Publication Data

US 2011/0001746 A1 Jan. 6, 2011

(30) Foreign Application Priority Data

Jul. 2, 2009 (KR) .................. 10-2009-0060236

(51) Int. Cl.
*G09G 3/00* (2006.01)
*G06F 3/038* (2013.01)

(52) U.S. Cl.
USPC ................................. 345/6; 345/213; 345/32

(58) Field of Classification Search
USPC ...................... 345/6, 419, 426, 619
See application file for complete search history.

(56) References Cited

U.S. PATENT DOCUMENTS

| | | | |
|---|---|---|---|
| 6,005,608 A * | 12/1999 | Chakrabarti | 348/46 |
| 6,720,961 B2 | 4/2004 | Tracy | |
| 7,113,188 B2 * | 9/2006 | Kuroda et al. | 345/426 |
| 8,199,069 B2 * | 6/2012 | Ito | 345/6 |
| 8,432,411 B2 * | 4/2013 | Bell et al. | 345/589 |
| 2004/0145537 A1 | 7/2004 | Yoshizawa et al. | |
| 2004/0150584 A1 | 8/2004 | Chuman et al. | |
| 2008/0122865 A1 * | 5/2008 | Vanmoor | 345/619 |
| 2008/0231548 A1 | 9/2008 | Koyama | |

FOREIGN PATENT DOCUMENTS

| | | |
|---|---|---|
| JP | 2007-199427 | 8/2007 |
| KR | 10-2001-0011108 | 2/2001 |
| KR | 10-2006-0022198 | 3/2006 |
| KR | 10-2006-0124988 | 12/2006 |

* cited by examiner

*Primary Examiner* — Amare Mengistu
*Assistant Examiner* — Jennifer Zubajlo
(74) *Attorney, Agent, or Firm* — Harness, Dickey & Pierce, P.L.C.

(57) ABSTRACT

An apparatus for displaying a three-dimensional (3D) image may include a plurality of display panels and a controller configured to apply image signals to each of the plurality of display panels. At least one of the display panels may include a transparent display panel. The plurality of display panels may be spaced apart from each other in a depth direction. A method of displaying a three-dimensional (3D) image may include displaying plane images on each of a plurality of display panels. At least one of the plurality of display panels may include a transparent display panel. The plurality of display panels may be spaced apart from each other in a depth direction.

20 Claims, 4 Drawing Sheets

APPARATUSES FOR AND METHODS OF DISPLAYING THREE-DIMENSIONAL IMAGES

CROSS-REFERENCE TO RELATED APPLICATION(S)

This application claims priority from Korean Patent Application No. 10-2009-0060236, filed on Jul. 2, 2009, in the Korean Intellectual Property Office (KIPO), the entire contents of which are incorporated herein by reference.

BACKGROUND

1. Field

Example embodiments relate to apparatuses for and methods of displaying three-dimensional (3D) images.

2. Description of the Related Art

Apparatuses for displaying a three-dimensional (3D) image may be used in various fields, such as for medical images, games, advertisement, education, and/or the military. In addition, holography and/or stereoscopy may be widely studied as techniques for displaying 3D images.

Holography may be an ideal method of displaying a 3D image. However, a coherent light source may be needed and/or it may be hard to record and/or reproduce large objects located in the far distance.

In stereoscopy, two 2D images having binocular parallax may be separately shown to each eye of a person so as to create a 3D effect. Here, two plane images may be used so that a 3D image may be easily realized. Stereoscopy may be classified into a glasses type or an autostereoscopy type. In the glasses type, supplementary means for viewing the images separately by each eye may be used. In the autostereoscopy type, images may be directly separated on a display into two visual fields. The autostereoscopy type may generally be used more frequently than the glasses type, in which glasses may be additionally worn. For example, a parallax barrier lens and/or a lenticular lens may be used. However, in such 3D image realization method, 2D images may be used to virtually realize a 3D image as an optical illusion. As a result, a viewing range may be limited and/or a viewer's eyes may get tired.

SUMMARY

Example embodiments may include apparatuses and/or methods of displaying three-dimensional (3D) images that may realize 3D images having improved 3D effects without using any supplementary means.

Additional aspects will be set forth in part in the description which follows and, in part, will be apparent from the description, and/or may be learned by practice of example embodiments.

According example embodiments, an apparatus for displaying a three-dimensional (3D) image may includes a plurality of display panels and/or a controller. At least one of the plurality of the display panels may include a transparent display panel. The plurality of display panels may be spaced apart from each other in a depth direction. The controller may apply image signals to each of the plurality of display panels.

A display panel disposed at the rearmost in the depth direction from among the plurality of display panels may include a liquid crystal display (LCD) panel.

The at least one display panel from among the plurality of display panels may include an organic light emitting device (OLED) panel including OLEDs.

The transparent display panel may include a transparent OLED panel. For example, the transparent OLED panel may include a transparent substrate, a first transparent electrode layer, an organic light emitting layer, a second transparent electrode layer, and/or a transparent oxide transistor. The first transparent electrode layer, organic light emitting layer, and/ or second transparent electrode layer may be sequentially formed on the transparent substrate to constitute a pixel. The transparent oxide transistor may be used for pixel switching.

The apparatus may further include a driving unit. The driving unit may move at least one of the plurality of display panels in a depth direction.

The controller respectively may apply the image signals to each of the plurality of display panels according to a time lag. In example embodiments, the time lag may be controlled according to the locations of the plurality of display panels.

According to example embodiments, a method of displaying a three-dimensional (3D) image may include displaying plane images on each of a plurality display panels. At least one of the plurality of display panels may include a transparent display panel. The plurality of display panels may be spaced apart from each other in the depth direction.

The method may further include controlling intervals between each of the plurality of display panels in order to enhance a depth perception of 3D image. Also, the method may further include respectively displaying the plane images on each of the plurality of display panels according to a time lag in order to enhance a depth perception of 3D image.

According to example embodiments, an apparatus for displaying a three-dimensional (3D) image may include a plurality of display panels and/or a controller configured to apply image signals to each of the plurality of display panels. At least one of the display panels may include a transparent display panel. The plurality of display panels may be spaced apart from each other in a depth direction.

According to example embodiments, a method of displaying a three-dimensional (3D) image may include displaying plane images on each of a plurality of display panels. At least one of the plurality of display panels may include a transparent display panel. The plurality of display panels may be spaced apart from each other in a depth direction.

BRIEF DESCRIPTION OF THE DRAWINGS

The above and/or other aspects and advantages will become more apparent and more readily appreciated from the following detailed description of example embodiments, taken in conjunction with the accompanying drawings, in which.

DETAILED DESCRIPTION

Figure 1:
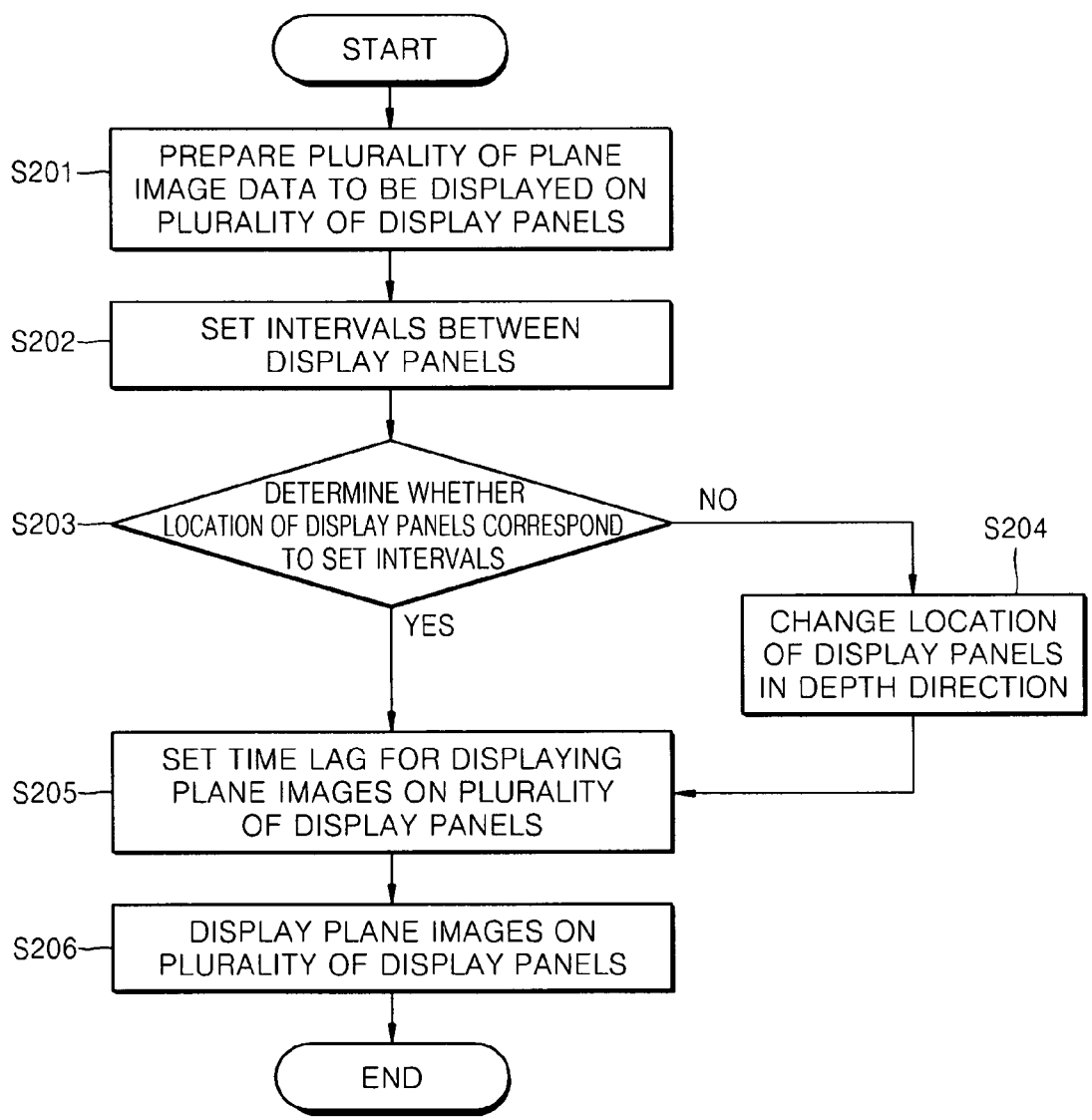
FIG. 1 is a flowchart illustrating a method of displaying a three-dimensional (3D) image, according to example embodiments.

Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions are exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, and/or components.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which are illustrated in the accompanying drawings, wherein like reference numerals may refer to like components throughout.

FIG. 1 is a flowchart illustrating a method of displaying a three-dimensional (3D) image, according to example embodiments. In the method of displaying a 3D image according to example embodiments, plane images may be respectively displayed on a plurality of display panels spaced apart from each other along a depth direction and, thus, a 3D image may be formed. In this case, at least one transparent display panel may be used so that a combination of the images displayed on the plurality of display panels may be recognized by an observer. Also, in order to enhance the perceived depth of a 3D image, intervals between the display panels may be respectively adjusted and/or the plane images may be selectively displayed on the plurality of display panels according to time lag.

Referring to FIG. 1, a plurality of plane image data to be displayed on a plurality of display panels may be prepared, in operation S201. In order to recognize a combination of the plurality of plane image data as a 3D image, the number of plane image data for one frame may be, for example, the same as the number of display panels. The plurality of plane image data may include information about depth locations of the display panels on which the plurality of plane image data may be displayed. If there exists a large number of plane image data for forming a frame of 3D image, that is, a large number of display panels, it may be easy to achieve a 3D effect. However, according to example embodiments, the number of display panels to be used may be reduced by including a process of adjusting the depth of the 3D image.

In order to enhance a 3D effect, intervals between the display panels may be set, in operation S202. Then, whether the locations of the display panels correspond to the set intervals may be determined, in operation S203. If needed, the locations of the display panels in depth directions may be changed, in operation S204. Here, at least one display panel from among the plurality of display panels may be driven to move along the depth direction. For example, the rear most display panel from among the plurality of display panels may be fixed and the locations of the other display panels may be relatively adjusted. However, example embodiments are not limited thereto.

Then, time lag for displaying the plane images on the plurality of display panels may be set, in operation S205. In example embodiments, in consideration of the intervals between the display panels, the time lag may be determined. In example embodiments, the operation of setting the time lag may be optional. That is, a plurality of the plane images may be displayed on the plurality of display panels at the same time and/or according to the set time lag, in operation S206. Accordingly, the observer may recognize the combination of the plane images displayed on the plurality of display panels as a 3D image.

Figure 2:
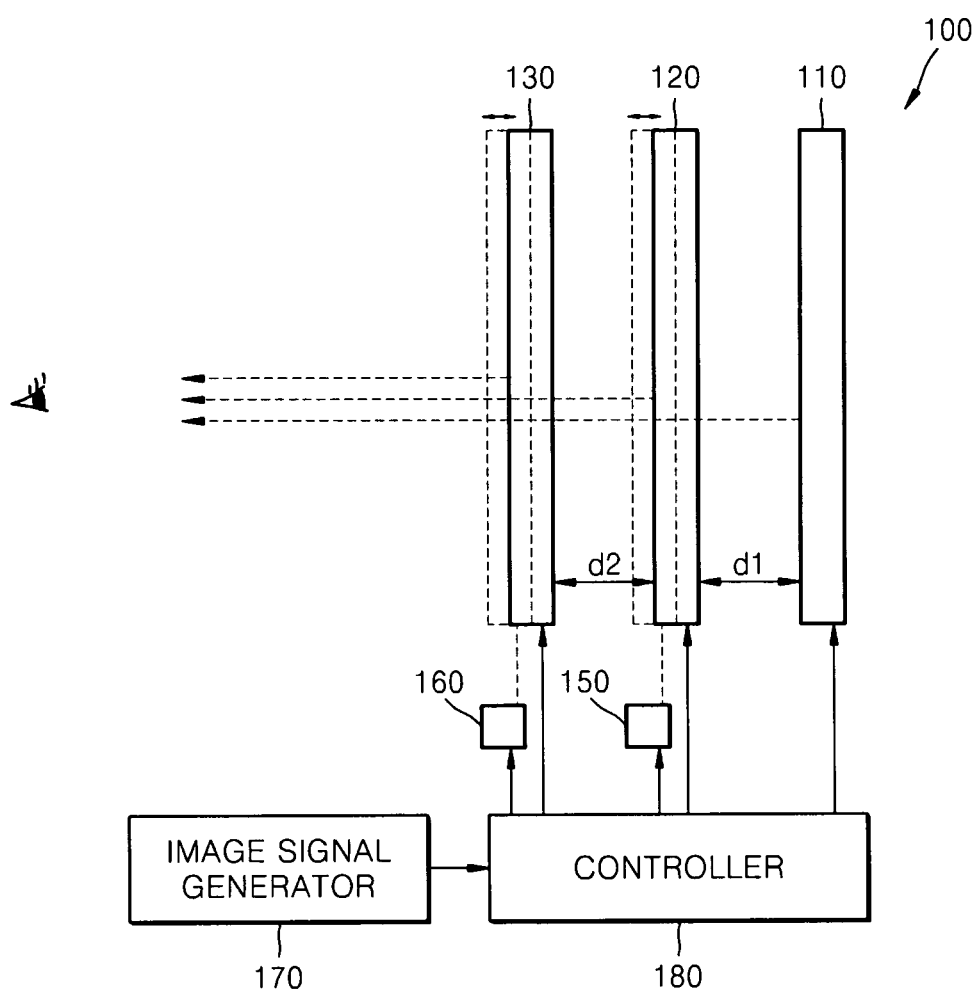
FIG. 2 schematically illustrates an apparatus for displaying a 3D image according to example embodiments.
Figure 3:
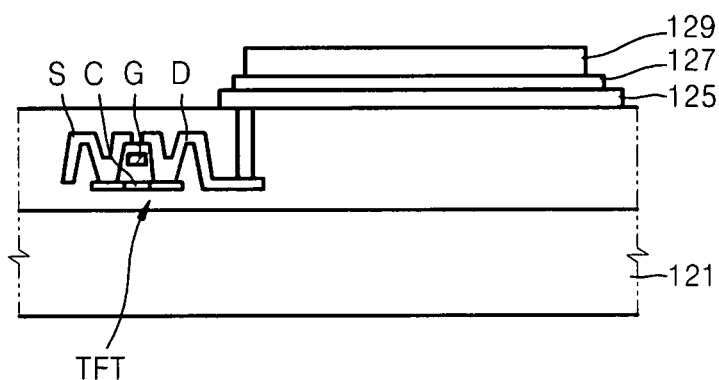
FIG. 3 is a cross-sectional view of an organic light emitting device (OLED) panel that may be implemented as a display panel of the apparatus for displaying a 3D image of FIG. 2.

FIG. 2 schematically illustrates an apparatus 100 for displaying a 3D image according to example embodiments. FIG. 3 is a cross-sectional view of an organic light emitting device (OLED) panel that may be employed as a display panel of the apparatus 100 for displaying a 3D image of FIG. 2.

Referring to FIG. 2, the apparatus 100 for displaying a 3D image may include a plurality of display panels 110, 120, and/or 130 and a controller 180 that respectively applies plane image signals to the plurality of display panels 110, 120, and/or 130. Also, driving units 150 and/or 160 may be further included, wherein each of the driving units 150 and 160 may move at least one of the plurality of display panels 110, 120, and 130 along the depth direction.

For example, the apparatus 100 for displaying a 3D image may include the first display panel 110, the second display panel 120, the third display panel 130, the driving units 150 and/or 160 for respectively driving the second display panel 120 and/or the third display panel 130 along the depth direction, an image signal generator 170 that may generate the plane image signals, which may correspond to plane images to be respectively displayed on the first display panel 110, the second display panel 120, and/or the third display panel 130, and/or the controller 180 that respectively applies the image signals to the first display panels 110, the second display panel 120, and/or the third display panel 130 and/or respectively controls the driving units 150 and/or 160.

At least one selected from the group of the display panels 110, 120, and/or 130 may be a transparent display panel. In the display panels 110, 120, and/or 130, the first display panel 110 may be disposed, for example, at the rear most and may not be a transparent display panel. For example, only the second display panel 120 and/or the third display panel 130 from among the display panels 110, 120, and/or 130 may be transparent. The second display panel 120 and/or the third display panel 130 may be transparent in order for the observer to recognize the plane images displayed on the display panels 110, 120, and/or 130 at the same time. An organic light emitting device (OLED) panel in which OLEDs are used may be implemented as any of the display panels 110, 120, and/or 130. The OLED panel may be self-emissive, may have lower power consumption than that of a liquid crystal display (LCD) panel, and/or may be thinner than the LCD panel. Thus, the OLED panel may be implemented as a display panel driven to move along a depth direction, such as in example embodiments. In addition or in the alternative, the OLED panel may be a transparent display panel. That is, a transparent OLED panel may be implemented for one or both of the second display panel 120 and the third display panel 130, and/or an OLED panel that emits in one direction may be employed as the first display panel 110. The structure of any of the described above OLED panels may be described in more detail with reference to FIG. 3. Since the first display panel 110 may not be transparent, the first display panel 110 may be an LCD panel. In this case, although not illustrated, the LCD panel may be a light receiving device and/or may further include a backlight.

In FIG. 2, three display panels are illustrated. However, this is only an example, and two or more than three display panels may be included in the apparatus 100 for displaying a 3D image.

The apparatus 100 for displaying a 3D image according to example embodiments may include driving units that move at least one of the plurality of display panels 110, 120, and 130 along the depth direction. For example, the driving unit 150 driving the second display panel 120 and/or the driving unit 160 driving the third display panel 130 may be included. In this case, the first display panel 110 may be fixed and/or the second display panel 120 and the third display panel 130 may be moved to adjust distances d1 and/or d2. For example, when the LCD panel may be employed as the first display panel 110 and thus, the backlight may be included, the relatively large LCD panel may be fixed and/or the driving units 150 and/or 160 may be configured to move the second display panel 120 and/or the third display panel 130. However, this is only an example. For example, the second display panel 120 and/or the third display panel 130 may be fixed. A driving unit that may move, for example, all of the plurality of display panels 110, 120, and 130 may be included.

The controller 180 may apply the plane image signals to the first display panel 110, the second display panel 120, and/or the third display panel 130, respectively. For example, the controller 180 may receive the plane image signals, which correspond to the plurality of plane image data generated by the image signal generator 170, and/or may apply the plane image signals to the display panels 110, 120, and/or 130 according to information about depths included in the plane image data. In addition, the controller 180 may control the driving units 150 and/or 160. For example, the controller 180 may set the interval d1 between the first display panel 110 and the second display panel 120, may set the interval d2 between the second display panel 120 and the third display panel 130, and/or may control the driving units 150 and 160 so as to move the second display panel 120 and/or the third display panel 130 in order for the locations of the second display panel 120 and/or the third display panel 130 to correspond to the set intervals d1 and/or d2. Also, the controller 180 may apply the plane image signals to the display panels 110, 120, and/or 130 at the same time and/or according to the set time lag. When the plane image signals may be applied to the display panels 110, 120, and/or 130 according to the time lag, the time lag may be determined in consideration of the set intervals d1 and/or d2. Applying of the plane image signals to the display panels 110, 120, and/or 130 according to the time lag will be described in more detail with reference to FIGS. 4 and 5. Moreover, as a general structure for controlling the display panels 110, 120, and 130, the controller 180 may include an analog-to-digital (A/D) converting circuit for converting an analog image signal into a digital signal and/or a driver IC for pixel driving in the display panels 110, 120, and/or 130.

A cross-section of an OLED panel that may be implemented as any of the display panels 110, 120, and/or 130 in the apparatus 100 for displaying a 3D image according to example embodiments is described with reference to FIG. 3. The OLED panel may include a transparent substrate 121, a first electrode layer 125, an organic light emitting layer 127, and/or a second electrode layer 129. The first electrode layer 125, organic light emitting layer 127, and/or second electrode layer 129 may be formed on the transparent substrate 121 to constitute a pixel. Also, a thin film transistor (TFT) for pixel switching may be formed on the transparent substrate 121.

The transparent substrate 121 may be formed, for example, of glass and/or transparent plastic. The first electrode layer 125 and/or the second electrode layer 129 may be formed of metal, such as Aluminum (Al) and/or indium tin oxide (ITO). The first electrode layer 125 and/or the second electrode layer 129 may be formed of transparent electrode material, such as ITO. Also, the organic light emitting layer 127 may be formed of monomer material, such as Tris(8-hydroxyquinolinato) aluminum ($Alq_3$) and/or anthracene, and/or polymer material, such as poly (p-phenylenevinylene) (PPV) and/or polythiophene (PT). Although not illustrated, in order to increase luminous efficiency, a hole transfer layer (HTL) may be interposed between the first electrode layer 125 and the organic light emitting layer 127 and/or an electron transfer layer (ETL) may be interposed between the organic light emitting layer 127 and the second electrode layer 129. A channel layer C of the TFT may be formed, for example, of amorphous silicon and/or polycrystalline silicon. In example embodiments, an oxide semiconductor material that has high mobility and/or may be easily formed on a large area may be used for forming the TFT. For example, a transparent oxide semiconductor or semiconductors, such as zinc oxide, tin oxide, Ga—In—Zn oxide, In—Zn oxide, and/or In—Sn oxide may be used.

One or both of the first electrode layer 125 and second electrode layer 129 may be formed of transparent electrode material. A transparent oxide transistor may be implemented as a switching device, so that the entire display panel may be transparent. Such structure may be employed in the second display panel 120 and/or the third display panel 130, which may be transparent display panels. Also, when one of the first electrode layer 125 and the second electrode layer 129 may be formed of transparent electrode material and the other may be formed of reflective metal, such a display panel may not be transparent, may emit light in one direction, and/or may be employed in the first display panel 110.

Although not illustrated in FIG. 3 in more detail, since only one pixel is illustrated, in the OLED panel, a plurality of such pixels may be arrayed. Gates G of the TFTs of the pixel array may be connected in one direction so as to form a scan line. Sources S of the TFTs of the pixel array may be respectively connected in another direction so as to form a data line. Drain D of each of the TFTs of the pixel array may be connected to the first electrode layers 125 so as to apply a voltage for pixel switching.

Figure 4:
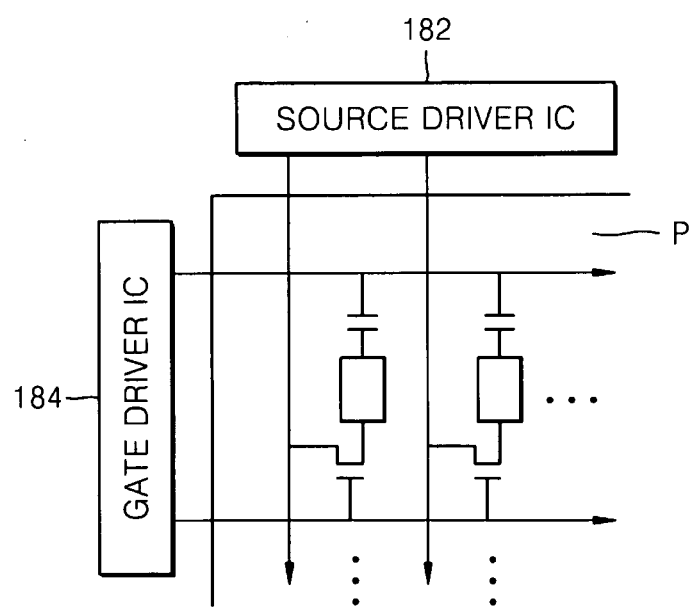
FIG. 4 is an equivalent circuit view, schematically illustrating pixel driving of a display panel implemented in the apparatus for displaying a 3D image of FIG. 2.
Figure 5:
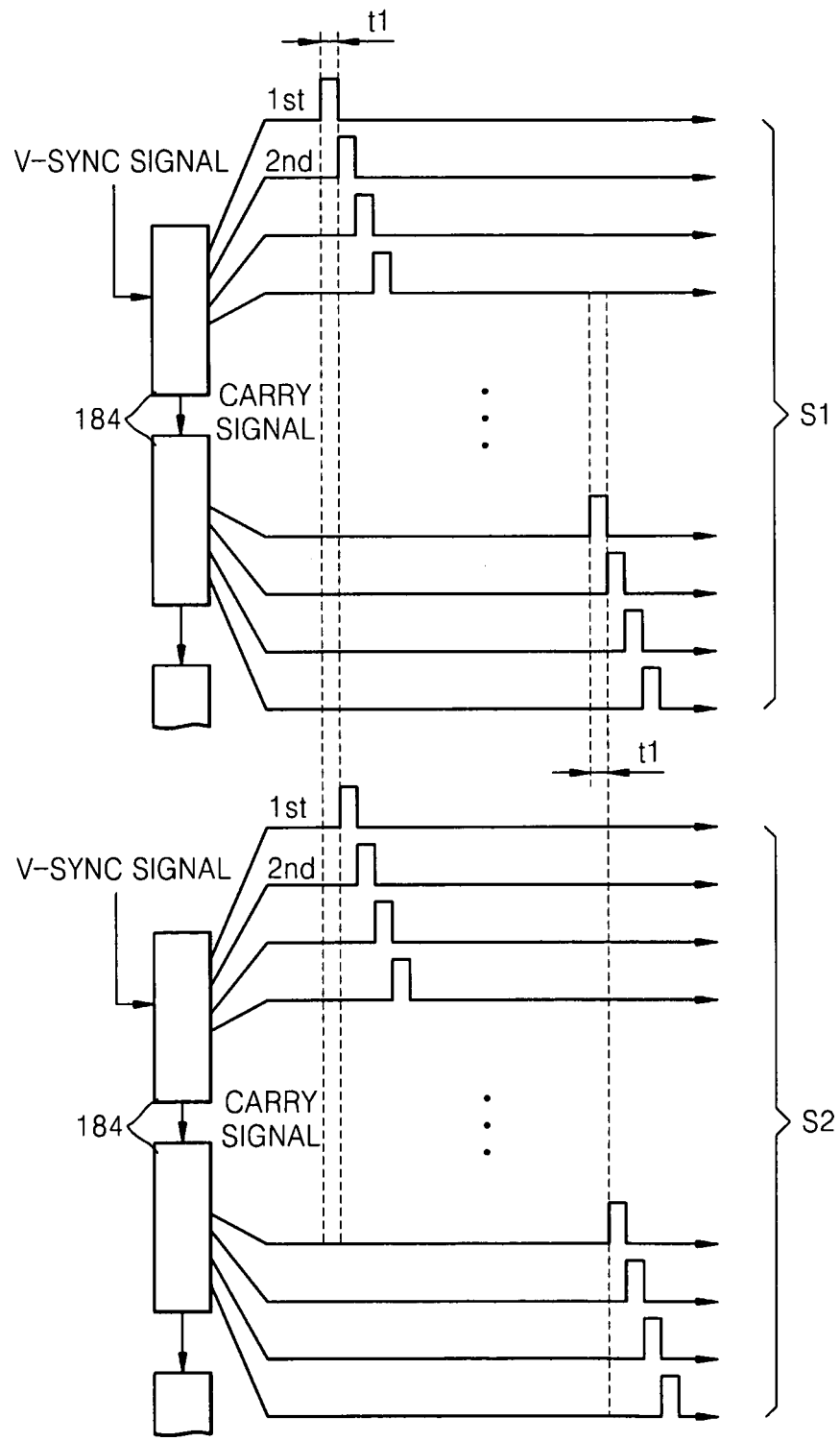
FIG. 5 illustrates a method of applying image signals to a plurality of display panels according to time lag.

FIG. 4 is an equivalent circuit view schematically illustrating pixel driving of a display panel P implemented in the apparatus 100 for displaying a 3D image of FIG. 2. FIG. 5 illustrates a method of applying image signals to a plurality of display panels according to time lag.

In FIG. 4, the display panel P may be the first display panel 110, the second display panel 120, or the third display panel 130. Referring to FIG. 4, as described with reference to FIG. 3, the gates G of a plurality of TFTs in a plurality of pixels in the display panel P may be connected by a signal wiring in a transverse direction and/or may be connected to a gate driver IC 184. Sources S of the TFTs in the pixels in the display panel P may be connected by a signal wiring in a longitudinal direction and/or may be connected to a source driver IC 182. The gate driver IC 184 may sequentially generate on/off signals on a signal wiring. The source driver IC 182 may change image information digital data to a pixel voltage and/or may apply the pixel voltage to the signal wiring.

Referring to FIG. 5, S1 indicates the wave form of a signal applied to one display panel, for example, the first display panel 110, and S2 indicates the wave form of a signal applied to another display panel, for example, the second display panel 120. The gate driver IC 184 may receive a vertical synchronization signal (V-sync signal) that indicates the start of one frame, may generate a scan pulse, and/or may sequentially move the pulse according to a carry signal. Here, the signal S2 in the second display panel 120 may be applied according to time lag t1. In other words, corresponding to a second scan pulse applied to the first display panel 110 in the gate driver IC 184, the first scan pulse may be sent to start at the gate signal wiring of the second display panel 120. However, example embodiments are not limited to such timing.

In FIG. 5, the signals applied to the display panels 110 and 120 may be illustrated to describe driving according to time lag. However, the number of display panels may not be limited and/or may be three or more. In addition, the time lag t1 is illustrated as width of one pulse, but this is only an example. The time lag t1 may be varied in consideration of, for example, the type of image and/or the degree of a 3D effect.

According to the apparatuses for and/or methods of displaying 3D images, a 3D image may be realized without using supplementary means, such as special glasses, and/or without limiting an observer to a location. In addition, the depth perception of a 3D image may be controlled. In other words, by using a plurality of display panels, which may include the transparent display panel, may be configured to move in the depth direction, and/or may be configured to drive according to time lag, a number of display panels may be reduced and/or a 3D image having improved 3D effect may be formed.

While example embodiments have been particularly shown and described, it will be understood by those of ordinary skill in the art that various changes in form and details may be made therein without departing from the spirit and scope of the present invention as defined by the following claims.

What is claimed is:

1. An apparatus for displaying a three-dimensional (3D) image, the apparatus comprising:
   a plurality of display panels;
   a driving unit configured to move at least one of the plurality of display panels in a depth direction so as to adjust one or more intervals between the plurality of display panels; and
   a controller configured to apply image signals to each of the plurality of display panels according to time lag determined in consideration of the adjusted one or more intervals between the plurality of display panels;
   wherein at least one of the display panels comprises a transparent display panel, and
   wherein the plurality of display panels are spaced apart from each other in the depth direction.

2. The apparatus of claim 1, wherein one of the display panels, disposed at a rearmost position in the depth direction from among the plurality of display panels, comprises a liquid crystal display (LCD) panel.

3. The apparatus of claim 1, wherein the at least one of the display panels comprises an organic light-emitting device (OLED) panel including OLEDs.

4. The apparatus of claim 1, wherein the transparent display panel comprises a transparent organic light-emitting device (OLED) panel.

5. The apparatus of claim 4, wherein the transparent OLED panel comprises:
   a transparent substrate;
   a pixel; and
   a transparent oxide transistor for pixel switching.

6. The apparatus of claim 5, wherein the pixel comprises:
   a first transparent electrode layer;
   an organic light-emitting layer; and
   a second transparent electrode layer.

7. The apparatus of claim 6, wherein the first transparent electrode layer, the organic light-emitting layer, and the second transparent electrode layer are sequentially formed on the transparent substrate to constitute the pixel.

8. The apparatus of claim 1, wherein one of the display panels, disposed at a rearmost position in the depth direction from among the plurality of display panels, is fixed.

9. A method of displaying a three-dimensional (3D) image, the method comprising:
   displaying plane images on each of a plurality of display panels spaced apart from each other in a depth direction;
   moving at least one of the plurality of display panels in the depth direction so as to adjust one or more intervals between the plurality of display panels; and
   changing the displaying of the plane images on the plurality of display panels according to time lag determined in consideration of the adjusted one or more intervals between the plurality of display panels;
   wherein at least one of the plurality of display panels comprises a transparent display panel.

10. The method of claim 9, wherein the moving the at least one of the plurality of display panels enhances depth perception of the 3D image.

11. The method of claim 9, wherein one of the display panels, disposed at a rearmost position in the depth direction from among the plurality of display panels, comprises a liquid crystal display (LCD) panel.

12. The method of claim 9, wherein one of the display panels, disposed at a rearmost position in the depth direction from among the plurality of display panels, is fixed.

13. An apparatus for displaying a three-dimensional (3D) image, the apparatus comprising:
- a plurality of display panels;
- a driving unit configured to move at least one of the plurality of display panels in a depth direction so as to adjust one or more locations of the plurality of display panels; and
- a controller configured to apply image signals to each of the plurality of display panels according to time lag determined in consideration of the adjusted one or more locations of the plurality of display panels;
- wherein at least one of the display panels comprises a transparent display panel, and
- wherein the plurality of display panels are spaced apart from each other in the depth direction.

14. The apparatus of claim 13, wherein one of the display panels, disposed at a rearmost position in the depth direction from among the plurality of display panels, comprises a liquid crystal display (LCD) panel.

15. The apparatus of claim 13, wherein the at least one of the display panels comprises an organic light-emitting device (OLED) panel including OLEDs.

16. The apparatus of claim 13, wherein the transparent display panel comprises a transparent organic light-emitting device (OLED) panel.

17. The apparatus of claim 16, wherein the transparent OLED panel comprises:
- a transparent substrate;
- a pixel; and
- a transparent oxide transistor for pixel switching.

18. The apparatus of claim 17, wherein the pixel comprises:
- a first transparent electrode layer;
- an organic light-emitting layer; and
- a second transparent electrode layer.

19. The apparatus of claim 18, wherein the first transparent electrode layer, the organic light-emitting layer, and the second transparent electrode layer are sequentially formed on the transparent substrate to constitute the pixel.

20. The apparatus of claim 13, wherein one of the display panels, disposed at a rearmost position in the depth direction from among the plurality of display panels, is fixed.

* * * * *